United States Patent
Kim et al.

(10) Patent No.: US 10,509,757 B2
(45) Date of Patent: Dec. 17, 2019

(54) INTEGRATED CIRCUITS HAVING EXPANDABLE PROCESSOR MEMORY

(71) Applicant: Altera Corporation, San Jose, CA (US)

(72) Inventors: Paul Kim, Fremont, CA (US); Alfredo de la Cruz, San Jose, CA (US); Gary Brian Wallichs, San Jose, CA (US); Yi Peng, Newark, CA (US)

(73) Assignee: Altera Corporation, San Jose, CA (US)

( * ) Notice: Subject to any disclaimer, the term of this patent is extended or adjusted under 35 U.S.C. 154(b) by 233 days.

(21) Appl. No.: 15/273,321

(22) Filed: Sep. 22, 2016

(65) Prior Publication Data
US 2018/0081696 A1 Mar. 22, 2018

(51) Int. Cl.
*G06F 1/24* (2006.01)
*G06F 13/40* (2006.01)
*G06F 17/50* (2006.01)
*G06F 13/16* (2006.01)
*G06F 9/4401* (2018.01)

(52) U.S. Cl.
CPC ........ *G06F 13/4068* (2013.01); *G06F 9/4401* (2013.01); *G06F 9/4411* (2013.01); *G06F 13/1689* (2013.01); *G06F 13/4027* (2013.01); *G06F 17/505* (2013.01); *G06F 17/5072* (2013.01); *G06F 17/5077* (2013.01); *G06F 9/4416* (2013.01); *G06F 2217/84* (2013.01)

(58) Field of Classification Search
CPC .. G06F 9/4403; G06F 9/4406; G06F 13/1689; G06F 13/4027; G06F 13/4068; G06F 17/505; G11C 5/148; G11C 7/10
USPC .............................................................. 713/2
See application file for complete search history.

(56) References Cited

U.S. PATENT DOCUMENTS 5,426,378 A * 6/1995 Ong .................... H03K 19/1737
326/38
5,784,636 A * 7/1998 Rupp .................. G06F 15/7867
712/37
(Continued)

FOREIGN PATENT DOCUMENTS

WO 2007145869 A2 12/2007

*Primary Examiner* — Jaweed A Abbaszadeh
*Assistant Examiner* — Volvick Derose
(74) *Attorney, Agent, or Firm* — Treyz Law Group, P.C.; Tianyi He

(57) ABSTRACT

Integrated circuits may have programmable logic circuitry and hard-coded circuitry. The hard-coded circuitry may include data circuitry, a processor, and memory. As the hard-coded circuitry has a limited capacity, a portion of the programmable logic circuitry may be configured using configuration data to serve as expanded soft-coded memory for the hard-coded processor. Instructions for controlling settings of the data circuitry may be stored on the hard-coded and soft-coded memory. An additional portion of the programmable logic circuitry may be configured using the configuration data to serve as a soft-coded processor that executes the instructions stored on the soft-coded memory. Use of the soft-coded processor and/or expanded soft-coded memory may allow for more advanced algorithms for initialization and calibration of the data circuitry than when only hard-coded memory is used and may allow for updated processor circuitry to be implemented.

19 Claims, 11 Drawing Sheets

(56) References Cited

U.S. PATENT DOCUMENTS

| | | | |
|---|---|---|---|
| 6,505,329 B1* | 1/2003 | Matsuzawa | G06F 17/5068 257/E23.114 |
| 6,529,989 B1* | 3/2003 | Bashford | G06F 9/4403 710/10 |
| 6,738,962 B1* | 5/2004 | Flaherty | G06F 15/7867 326/38 |
| 7,190,190 B1* | 3/2007 | Camarota | G11C 7/20 326/37 |
| 7,346,644 B1* | 3/2008 | Langhammer | H03K 19/17732 326/38 |
| 7,398,379 B1* | 7/2008 | Wong | G06F 17/5054 713/1 |
| 7,424,553 B1* | 9/2008 | Borrelli | H04L 49/90 709/230 |
| 7,505,331 B1* | 3/2009 | Camarota | G11C 29/08 326/38 |
| 7,512,849 B1* | 3/2009 | Allen | G01R 31/318516 326/38 |
| 7,589,555 B1* | 9/2009 | Lewis | H03K 19/1735 326/38 |
| 7,715,467 B1* | 5/2010 | Burney | H03M 9/00 375/219 |
| 7,719,970 B1* | 5/2010 | Dada | H04L 12/4633 370/230 |
| 7,772,881 B1* | 8/2010 | Yap | G06F 17/5054 326/41 |
| 7,822,958 B1* | 10/2010 | Allen | G06F 9/4401 326/41 |
| 7,949,980 B1* | 5/2011 | Chan | G06F 17/505 713/100 |
| 8,166,436 B1 | 4/2012 | Baeckler | |
| 8,615,201 B1* | 12/2013 | Li | H04B 17/0097 455/67.11 |
| 8,813,018 B1* | 8/2014 | Gamsa | G06F 17/5045 716/101 |
| 8,918,706 B1* | 12/2014 | Lewis | H03M 13/6561 714/781 |
| 9,047,429 B2 | 6/2015 | He et al. | |
| 9,330,218 B1* | 5/2016 | Chiu | G11C 29/028 |
| 9,698,791 B2* | 7/2017 | Vassiliev | H03K 19/17704 |
| 9,792,395 B1* | 10/2017 | Pvss | G06F 17/505 |
| 9,811,628 B1* | 11/2017 | Park | G06F 17/5077 |
| 2001/0047473 A1 | 11/2001 | Fallon | |
| 2002/0084801 A1* | 7/2002 | Jefferson | H03K 19/17736 326/41 |
| 2003/0105617 A1* | 6/2003 | Cadambi | G06F 17/5022 703/14 |
| 2004/0124877 A1* | 7/2004 | Parkes | H03K 19/17736 326/41 |
| 2004/0207429 A1* | 10/2004 | Hashizume | G06F 17/5045 326/40 |
| 2005/0038981 A1* | 2/2005 | Connor | G06F 9/4411 713/1 |
| 2005/0203649 A1* | 9/2005 | Martin | G05B 19/052 700/87 |
| 2005/0248364 A1* | 11/2005 | Vadi | H03K 19/17732 326/39 |
| 2005/0257030 A1* | 11/2005 | Langhammer | G06F 15/7867 712/226 |
| 2006/0015313 A1* | 1/2006 | Wang | G06F 17/5027 703/14 |
| 2007/0079185 A1 | 4/2007 | Totolos | |
| 2007/0208883 A1* | 9/2007 | Birchen | G06F 9/4411 710/8 |
| 2007/0283311 A1* | 12/2007 | Karoubalis | G06F 17/5054 326/38 |
| 2007/0288687 A1* | 12/2007 | Panabaker | G06F 13/1615 711/103 |
| 2008/0298159 A1* | 12/2008 | Kawabata | G11C 7/10 365/233.5 |
| 2009/0160483 A1* | 6/2009 | Verma | H03K 19/177 326/41 |
| 2009/0164676 A1* | 6/2009 | Schaller | H04L 12/40006 710/100 |
| 2010/0184435 A1 | 7/2010 | Shellhammer et al. | |
| 2010/0281452 A1* | 11/2010 | Tokumaru | G06F 17/5068 716/113 |
| 2013/0051110 A1* | 2/2013 | Funaki | H03K 5/15006 365/63 |
| 2013/0145074 A1* | 6/2013 | Ball | H03K 19/1776 711/102 |
| 2013/0159725 A1* | 6/2013 | Koo | G06F 21/76 713/189 |
| 2015/0241874 A1* | 8/2015 | Agier | G06F 15/7871 700/11 |
| 2016/0139811 A1* | 5/2016 | Ikeuchi | H03K 19/17752 711/170 |
| 2016/0173104 A1* | 6/2016 | Vassiliev | H03K 19/17736 326/41 |
| 2016/0335383 A1* | 11/2016 | Yao | G06F 17/5054 |
| 2017/0373839 A1* | 12/2017 | Suresh | H04L 9/0618 |
| 2018/0039248 A1* | 2/2018 | Annen | G06F 11/20 |
| 2018/0113757 A1* | 4/2018 | Sakata | H03K 19/173 |

\* cited by examiner

INTEGRATED CIRCUITS HAVING EXPANDABLE PROCESSOR MEMORY

BACKGROUND

This relates to integrated circuits and more particularly, to integrated circuit devices such as programmable integrated circuits.

Integrated circuits often include hardwired (hard-coded) circuitry that is hardened upon fabrication of the integrated circuit. The hardwired circuitry can include transceiver circuitry that transmits and receives data across the integrated circuit or to other integrated circuits.

In practice, transceivers or other circuitry on the integrated circuit need to be initialized upon power up of the integrated circuit. For example, the transceivers typically need to be loaded with desired operational settings or parameters after power up. The integrated circuit includes a hardwired processor and a corresponding hardwired memory circuit that are dedicated to initialization and/or calibration of the transceiver. The hardwired processor performs initialization on the transceiver by executing initialization instructions stored on the hardwired memory circuit.

However, because the hardwired memory circuit is hardened during fabrication of the integrated circuit, the hardwired memory circuit has a limited and unincreasable storage capacity (i.e., a storage capacity that is set upon fabrication of the integrated circuit). Such limitations on the capacity of the hardwired memory circuit can inhibit the size and complexity of the initialization instructions that are stored on the hardwired memory circuit. This imposes a limit to the number and complexity of the initialization operations that can be performed on the transceiver, and can lead to undesirably high initialization latency for the integrated circuit upon power-up.

SUMMARY

Programmable integrated circuits may have programmable logic circuitry which is typically configured by loading configuration data onto the programmable logic circuitry. Integrated circuits may also have hard-coded (hardwired) circuitry that is hardened upon fabrication of the integrated circuit.

The hard-coded circuitry may include data circuitry such as transceiver and clocking circuitry. In order to initialize and calibrate settings of the transceiver and clocking circuitry, the hard-coded circuitry may include a processor and memory. As the hard-coded memory has a limited capacity, a portion of the programmable logic circuitry may be configured using the configuration data to serve as expanded soft-coded memory for the hard-coded processor. Instructions for controlling settings of the data circuitry may be stored on the hard-coded and soft-coded memory. The hard-coded processor may execute the instructions stored on both the hard-coded and the soft-coded memory to initialize and calibrate the data circuitry.

For example, the hard-coded memory may store a first set of instructions whereas the soft-coded memory stores a second set of instructions. The hard-coded processor may execute at least some of the first set and at least some of the second set of instructions to perform initialization and calibration operations on the data circuitry. In one suitable arrangement the hard-coded processor executes the first set of instructions prior to executing the second set of instructions. In this scenario, the hard-coded processor may execute the first set of instructions while the soft-coded memory powers on (e.g., before the soft-coded memory is fully powered on).

If desired, an additional portion of the programmable logic circuitry may be configured using the configuration data to serve as a soft-coded processor that executes instructions stored on the soft-coded memory, which may offer many advantages over the hard-coded processor. For example, the soft-coded processor may be an enhanced version of the soft-coded processor and/or may incorporate higher clock rates than the hard-coded processor. The hard-coded processor may perform a first set of initialization or calibration operations on the data circuitry by executing at least some of the first set of instructions stored on the hard-coded memory, whereas the soft-coded processor performs a second set of initialization or calibration operations on the data circuitry by executing at least some of the second set of instructions stored on the soft-coded memory. If desired, the hard-coded processor and hard-coded memory may be fully powered on at a first time after powering on the integrated circuit, whereas the soft-coded processor and the soft-coded memory are fully powered on at a second time that is after the first time. In this scenario, the hard-coded processor may perform the first set of initialization operations after the first time, whereas the soft-coded processor performs the second set of initialization operations after the second time (e.g., once the programmable logic circuitry has become fully powered on and operational). Due to the enhancements provided by the soft-coded processor and the expandable soft-coded memory of that processor, more advanced algorithms can be executed during initialization and calibration of the transceiver and clocking circuitry than in scenarios where only a hard-coded processor and memory is used.

In accordance with any of the above arrangements, logic design equipment may generate the configuration data for loading onto the integrated circuit (sometimes referred to herein as a target device). The programmable logic circuitry on the integrated circuit may implement a user logic design when loaded with the configuration data. The logic design equipment may identify a capacity of the hardwired memory circuitry, may identify a size of the instructions to be stored on the hardwired memory circuitry, and may determine whether the identified size exceeds the identified hard-coded capacity. In response to determining that the size of the initialization instructions exceeds the capacity of the hardwired memory circuitry, the logic design equipment may add expanded memory circuitry and optionally a soft-coded processor to the logic design (e.g., without the user or logic designer having knowledge of the addition). The logic design equipment may subsequently generate a netlist file by synthesizing the logic design having the expanded memory circuitry. The logic design equipment may generate the configuration data based on the netlist file.

DETAILED DESCRIPTION

Embodiments of the present invention relate to integrated circuits with expandable microprocessor memory circuitry. The integrated circuits may be any suitable type of integrated circuit, such as microprocessors, application-specific integrated circuits, digital signal processors, memory circuits, or other integrated circuits. If desired, the integrated circuits may be programmable integrated circuits that contain programmable logic circuitry. The present invention will generally be described in the context of integrated circuits such as programmable logic device (PLD) integrated circuits as an example.

Figure 1:
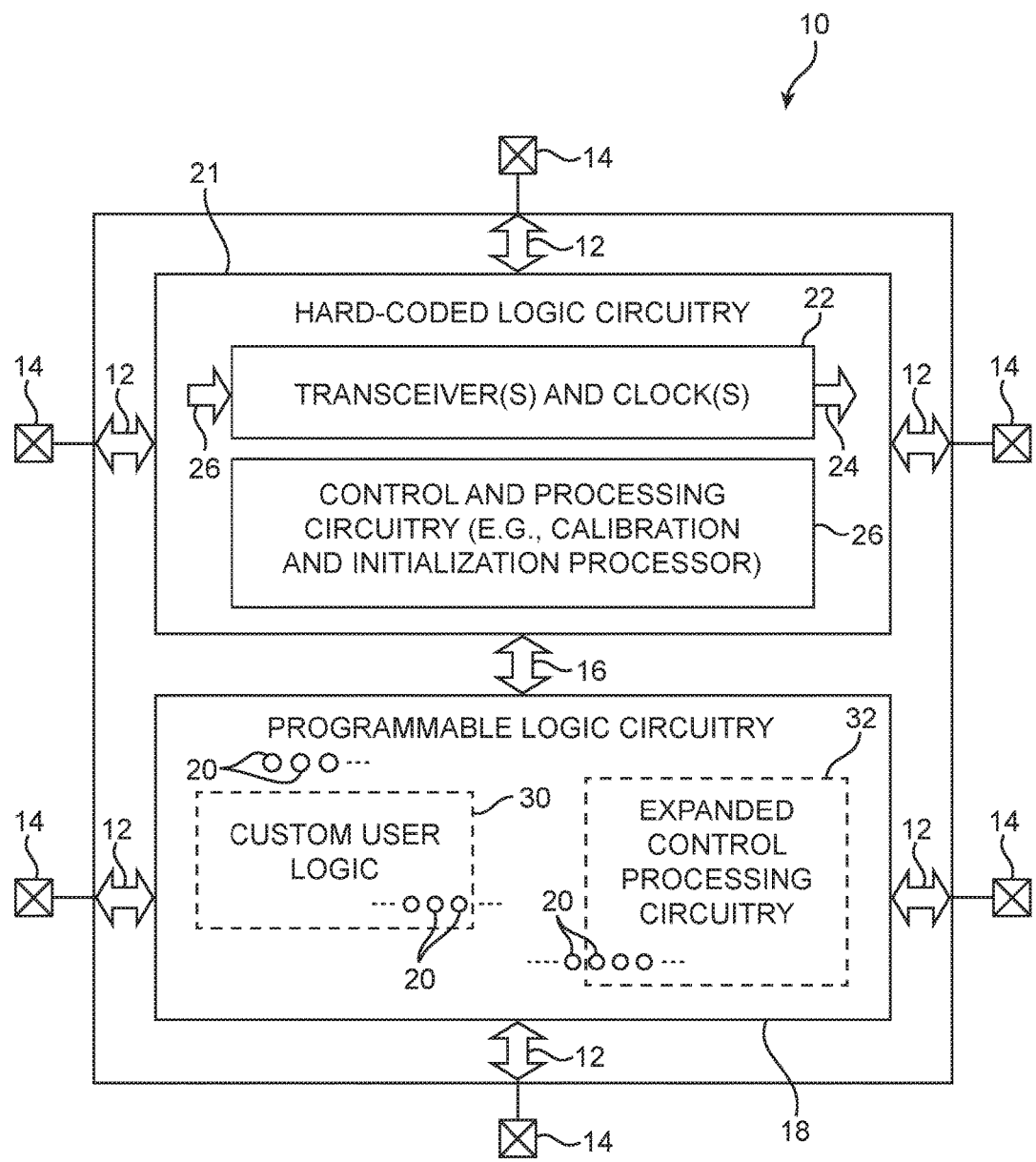
FIG. 1 is a diagram of an illustrative integrated circuit having programmable logic circuitry in accordance with an embodiment.

FIG. 1 is a diagram of an illustrative integrated circuit such as a programmable integrated circuit 10. Programmable device 10 may include input-output circuitry 12 for driving signals off of device 10 and for receiving signals from other devices via input-output pins 14. Interconnection resources 16 such as global and local vertical and horizontal conductive lines and buses may be used to route signals on device 10. Interconnection resources 16 include conductive lines and programmable connections between respective conductive lines and are therefore sometimes referred to as programmable interconnects 16.

Programmable device 10 may include programmable logic circuitry 18 that can be configured to perform custom logic functions. The programmable interconnects 16 may be considered to be a type of programmable logic 18, for example. Programmable logic circuitry 18 may also contain programmable memory elements 20. Memory elements 20 can be loaded with configuration data (also called programming data or a configuration data bit stream) using pins 14 and input-output circuitry 12. Once loaded, the memory elements may each provide a corresponding static control signal that controls the operation of an associated logic component in programmable logic 18. In a typical scenario, the outputs of the loaded memory elements 20 are applied to the gates of metal-oxide-semiconductor transistors in programmable logic 18 to turn certain transistors on or off and thereby configure the logic in programmable logic 18 and routing paths. Programmable logic circuit elements that may be controlled in this way include pass transistors, parts of multiplexers (e.g., multiplexers used for forming routing paths in programmable interconnects 16), look-up tables, logic arrays, various logic gates, etc.

Memory elements 20 may be implemented using any suitable volatile and/or non-volatile memory structures such as random-access-memory (RAM) cells, fuses, antifuses, programmable read-only-memory memory cells, mask-programmed and laser-programmed structures, combinations of these structures, etc. Because memory elements 20 are loaded with configuration data during programming, memory elements 20 are sometimes referred to as configuration memory, configuration RAM (CRAM), or programmable memory elements.

The circuitry of programmable logic 18 may be organized using any suitable architecture. As an example, the logic of circuitry 18 may be organized in a series of rows and columns of larger programmable logic regions each of which contains multiple smaller logic regions. The smaller regions may be, for example, regions of logic that are sometimes referred to as logic elements (LEs), each containing a look-up table (LUT), one or more registers, and programmable multiplexer circuitry. The smaller regions may also be, for example, regions of logic that are sometimes referred to as adaptive logic modules (ALMs). Each adaptive logic module may include a pair of adders, a pair of associated registers and a look-up table or other block of shared combinational logic (as an example). The larger regions may be, for example, logic array blocks (LABs) containing multiple logic elements or multiple ALMs. Programmable logic circuitry 18 may sometimes be referred to herein as core logic circuitry 18, programmable core 18, or soft logic circuitry 18.

Integrated circuit 10 may include hardwired logic circuitry 21 in addition to soft logic circuitry 18. Unlike soft logic 18, which may be loaded with configuration data multiple times after fabrication of integrated circuity 10 to implement desired user logic, hardwired (hard-coded) logic circuitry 18 is hardened during fabrication of integrated circuit 10.

The presence of hardwired circuitry 21 allows hardwired circuitry to be employed to handle tasks that are well suited to hardwired circuits such as video processing, microprocessor applications, communications (e.g., using a Universal Asynchronous Receiver Transmitter (UART)), disk drive control functions, etc. In one illustrative example that is sometimes described herein, hardwired circuitry 21 may include hardwired transceiver and clock circuitry 22. Circuitry 22 may, for example, include one or more high speed serial transceivers and one or more phase-locked loop (PLL) circuits or other clocking circuits. Transceivers in circuitry 22 may include transmitter circuitry for transmitting signals along output paths 24. Paths 26 and 24 may, for example, be serial interfaces along which serial data is conveyed at high data rates. In other suitable arrangements, paths 26 and 24 are parallel interfaces. Transceivers 22 may include receiver circuitry for receiving signals over input paths 26. The PLL circuits in circuitry 22 may be used to clock the transceivers in circuitry 22. Transceiver and clocking circuitry 22 may sometimes be referred to herein as data circuitry 22 or hard-coded data circuitry 22 (e.g., because circuitry 22 is involved in the transmission and reception of data).

In practice, transceiver and clocking circuitry 22 may need to be initialized upon power up of integrated circuit 10. For example, transceiver and clocking circuitry 22 may need to be loaded with desired operational settings after power up. Such settings may include, but are not limited to, frequency settings (e.g., frequencies at which signals are sent or received from circuitry 22), clock frequency settings, data rate settings, transceiver enable or disable settings (e.g., settings indicating individual transceivers within circuitry 22 to enable or disable), signal phase settings, offset settings, gain settings, signal integrity settings or parameters, other signal transmission, reception, or clocking settings, etc. Setting these parameters of circuitry 22 after power up may sometimes be referred to herein as initialization of circuitry 22. Once circuitry 22 has been initialized, circuitry 22 may operate normally (e.g., by transmitting and/or receiving data) using the corresponding settings.

Hardwired (hard-coded) circuitry 21 may include hardwired control and processing circuitry 26. Control and processing circuitry 26 may control the operation of transceiver circuitry 22. If desired circuitry 26 may control the operation of other hardwired components in circuitry 21 and/or may control one or more soft-coded components on programmable logic circuitry 18. As an example, hardwired control and processing circuitry 26 may perform initialization operations on circuitry 22 after device power up. Once the initialization has been performed, circuitry 22 may perform calibration operations to adjust or further calibrate the settings of circuitry 22 (e.g., the settings that were established when circuitry 22 is initialized). For example, if the performance of circuitry 22 is non-ideal, the circuitry may be calibrated by performing the calibration operations until the performance of circuitry 22 is acceptable.

Hardwired control and processing circuitry 26 may include a hardwired processor and corresponding memory circuitry. The hardwired memory may store code or other processing instructions that are executed by a hardwired processor in circuitry 26. The hardwired memory may be dedicated to that hardwired processor (e.g., so that only that processor has access to or executes the operations stored on the hardwired memory). As an example, an execution stack of processing instructions (code) may be stored on the hardwired memory. The processing instructions may be executed by the processor to perform calibration and initialization operations on transceiver circuitry 22. If desired, the hardwired memory circuitry may also store data (e.g., data for conveying using transceivers 22 and/or data for conveying to soft logic circuitry 18, processing variables, etc.).

Control and processing circuitry 26 may, if desired, be dedicated to performing initialization and calibration of transceiver and clocking circuitry 22 (e.g., circuitry 26 may not perform other processing operations for other circuitry on device 10). This may reduce the burden imposed on other processing circuitry that may be involved in other fundamental, higher-level programming tasks for device 10. This may also allow for reduced-latency initialization (relative to scenarios where transceiver and clocking circuitry does not have dedicated initialization and calibration circuitry), especially for transceiver protocols such as PCI-Express which impose a maximum time by which the serial link needs to be initialized.

Programmable logic circuitry 18 may be loaded with configuration data to implement custom user logic such as custom user logic circuitry 30. The custom user logic may consume some but not all of resources (e.g., memory elements 20) on programmable logic circuitry 18. The custom user logic may be designed by an end user (e.g., a logic programmer or logic designer) of integrated circuit device 10. The logic designer may design the custom user logic using a logic design system that generates configuration data that implements the custom user logic when loaded onto circuitry 10.

When generating a logic design for custom user circuitry 30, the logic designer or logic design system may generate an execution stack of instructions (e.g., initialization and calibration instructions) for storage on hardwired memory in circuitry 26. In some scenarios, the instructions for storage on the hardwired memory may exceed the capacity of the hardwired memory. If desired, control and processing circuitry 26 may be expanded into a portion of programmable logic circuitry 18. For example, programmable logic circuitry 18 may include expanded control and processing circuitry 32. Expanded circuitry 32 may include expanded memory for storage of processing instructions that would otherwise be stored on hardwired memory circuitry. If desired, expanded circuitry 32 may include one or more microprocessors for performing the operations of microprocessor circuitry in hard coded circuitry 26.

The example of FIG. 1 is merely illustrative. If desired, hardwired circuitry 21 and programmable logic circuitry 18 may be distributed across different locations on integrated circuit 10. For example, hardwired circuitry 21 may be located around the periphery of device 10 whereas programmable logic circuitry 18 is formed in the center or core of integrated circuit 10. In general, any desired locations may be used.

Figure 2:
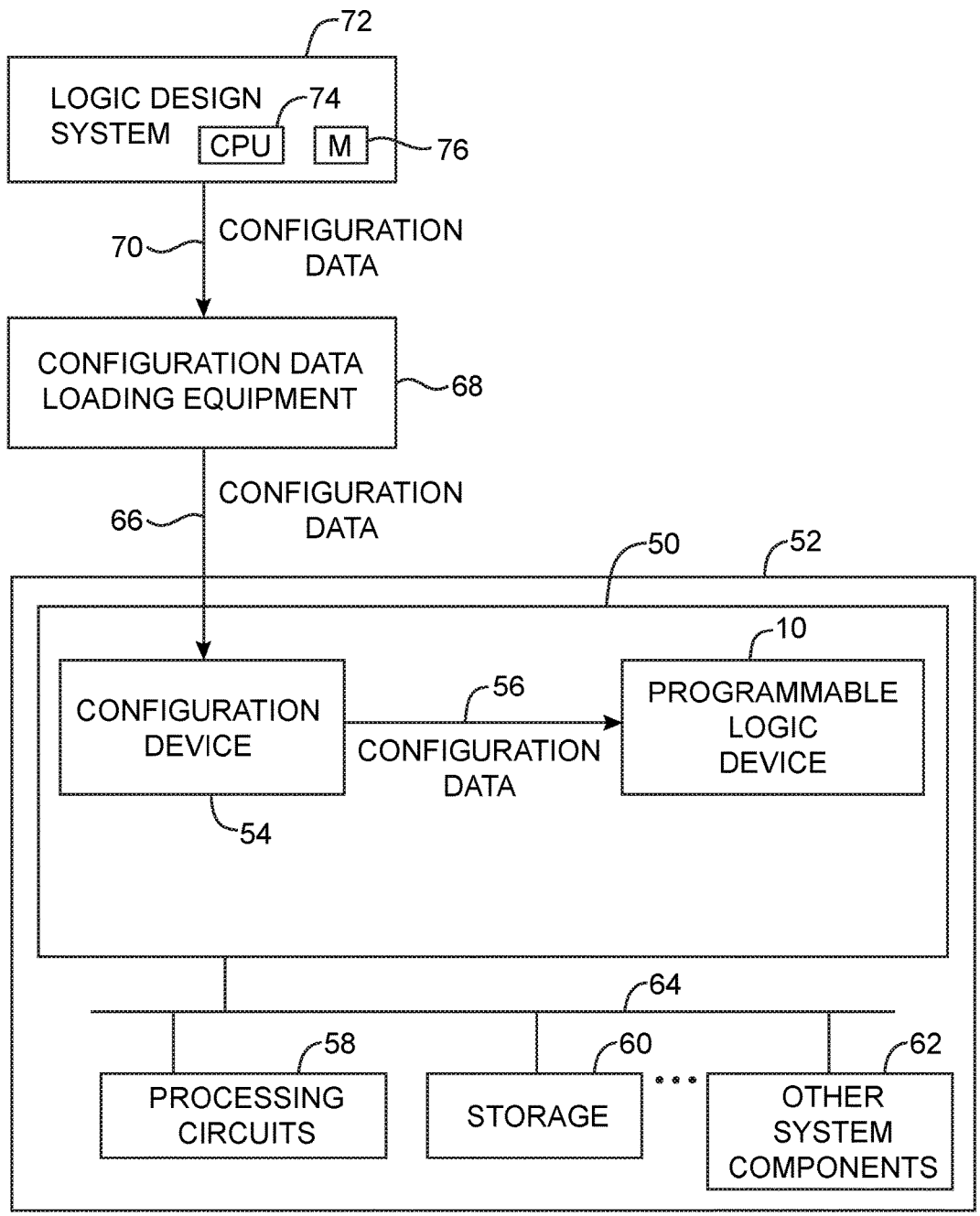
FIG. 2 is an illustrative diagram showing how configuration data may be generated by a logic design system and loaded into a programmable device in accordance with an embodiment of the present invention.

The various structures and components that are included in programmable logic circuitry 18 of integrated circuit 10 (e.g., custom user logic 30) can be designed using a circuit design system. An illustrative system environment for device 10 is shown in FIG. 2.

Device 10 may, for example, be mounted on a board 50 in a system 52. In general, programmable logic device 10 may receive configuration data from programming equipment or from other suitable equipment or device. In the example of FIG. 2, programmable logic device 10 is the type of programmable logic device that receives configuration data from an associated integrated circuit 54. With this type of arrangement, circuit 54 may, if desired, be mounted on the same board 50 as programmable logic device 10. Circuit 54 may be an erasable-programmable read-only memory (EPROM) chip, a programmable logic device configuration data loading chip with built-in memory (sometimes referred to as a configuration device), or other suitable device. When system 52 boots up (or at another suitable time), the configuration data for configuring the programmable logic device may be supplied to the programmable logic device from device 54, as shown schematically by path 56. The configuration data that is supplied to the programmable logic device may be stored in the programmable logic device in its configuration random-access-memory elements.

System 52 may include processing circuits 58, storage 60, and other system components 62 that communicate with device 10. The components of system 52 may be located on one or more boards such as board 50 or other suitable mounting structures or housings and may be interconnected by buses and other electrical paths 64. If desired, programmable device 10 may be loaded with configuration data without mounting device 10 and/or configuration device 54 to board 50 (e.g., using any desired configuration data loading equipment).

Configuration device 54 may be supplied with the configuration data for device 10 (sometimes referred to herein as target circuit or target device 10) over a path such as path 66. Configuration device 54 may, for example, receive the configuration data from configuration data loading equipment 68 or other suitable equipment that stores this data in configuration device 54. Device 54 may be loaded with data before or after installation on board 50.

It can be a significant undertaking to design and implement a desired (custom) logic circuit in a programmable logic device. Logic designers therefore generally use logic design systems based on computer-aided-design (CAD) tools to assist them in designing circuits. A logic design system can help a logic designer design and test complex circuits for a system. When a design is complete, the logic design system may be used to generate configuration data for electrically programming the appropriate programmable logic device.

As shown in FIG. 2, the configuration data produced by a logic design system 72 (sometimes referred to herein as logic design equipment 72, logic design computer 72, logic design processor 72, logic design computing equipment 72, logic design circuitry 72, or data stream generation circuitry 72) may be provided to equipment 68 over a path such as path 70. Equipment 68 provides the configuration data to device 54, so that device 54 can later provide this configuration data to the programmable logic device 10 over path 56. System 72 may be based on one or more computers and one or more software programs. In general, software and data may be stored on any computer-readable medium (storage) in system 72 and is shown schematically as storage 76 in FIG. 2. System 72 may include processing circuitry in the form of one or more processors such as central processing unit (CPU) 74. In general, any desired processing circuitry may be formed on system 72.

In a typical scenario, logic design system 72 is used by a logic designer to create a custom circuit (logic) design. For example, the logic designer may provide input commands to logic design system 72 (e.g., by selecting on screen commands displayed on a display screen, by entering commands using a user input device such as a mouse and/or keyboard, etc.). The system 72 produces corresponding configuration data which is provided to configuration device 56. Upon power-up, configuration device 56 and data loading circuitry on programmable logic device 10 are used to load the configuration data into CRAM cells on programmable logic region 18 of device 10. Device 10 may then be used in normal operation of system 52. The example of FIG. 2 is merely illustrative. In general, any desired system may be used to load configuration data generated by logic design system 72 onto programmable logic device 10.

Figure 3:
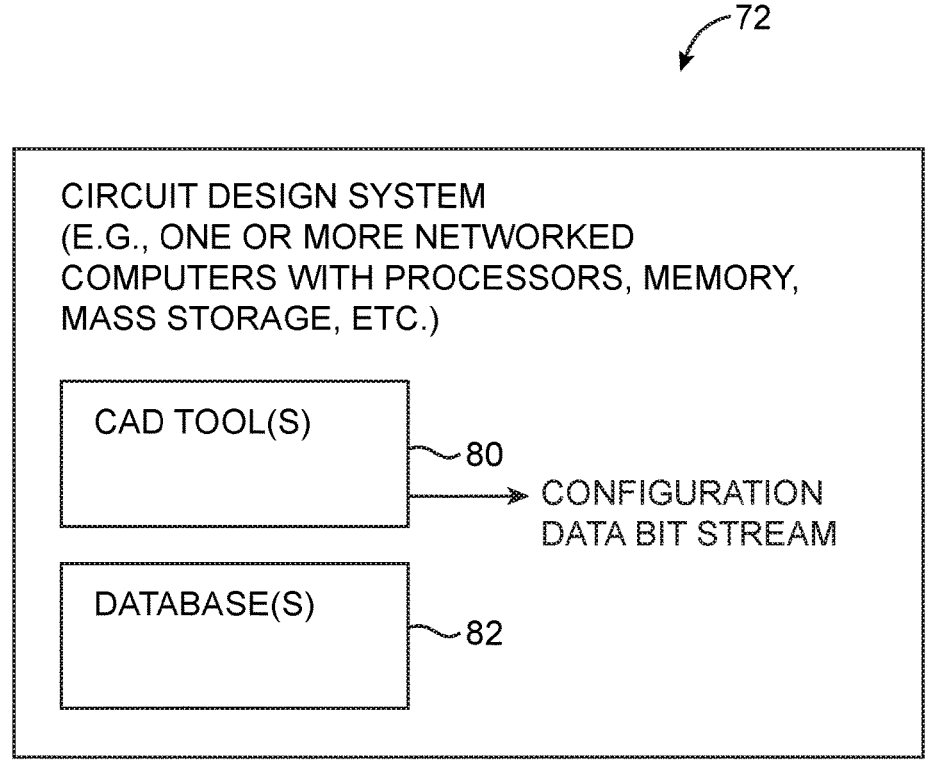
FIG. 3 is a diagram of a circuit design system that may be used to design integrated circuits in accordance with an embodiment.

FIG. 3 shows an illustrative circuit (logic) design system 72 of the type shown in FIG. 2. System 72 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 80 and databases 82 reside on system 72. During operation, executable software such as the software of computer aided design tools 80 runs on the processor(s) of system 72. Databases 82 are used to store data for the operation of system 72. In general, software and data may be stored on any computer-readable medium (storage) in system 72. Such storage may include computer memory chips, removable and fixed media such as hard disk drives, flash memory, compact discs (CDs), digital versatile discs (DVDs), blu-ray discs (BDs), other optical media, and floppy diskettes, tapes, or any other suitable memory or storage device(s). When the software of system 72 is installed, the storage of system 72 has instructions and data that cause the computing equipment in system 72 to execute various methods (processes). When performing these processes, the computing equipment is configured to implement the functions of the circuit design system.

The computer aided design (CAD) tools 80, some or all of which are sometimes referred to collectively as a CAD tool or an electronic design automation (EDA) tool, may be provided by a single vendor or by multiple vendors. Tools 80 may be provided as one or more suites of tools (e.g., a compiler suite for performing tasks associated with implementing a circuit design in a programmable logic device) and/or as one or more separate software components (tools). Database(s) 82 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired. Tools 80 may generate a configuration data bit stream for loading onto device 10 based on a user logic design, for example.

Figure 4:
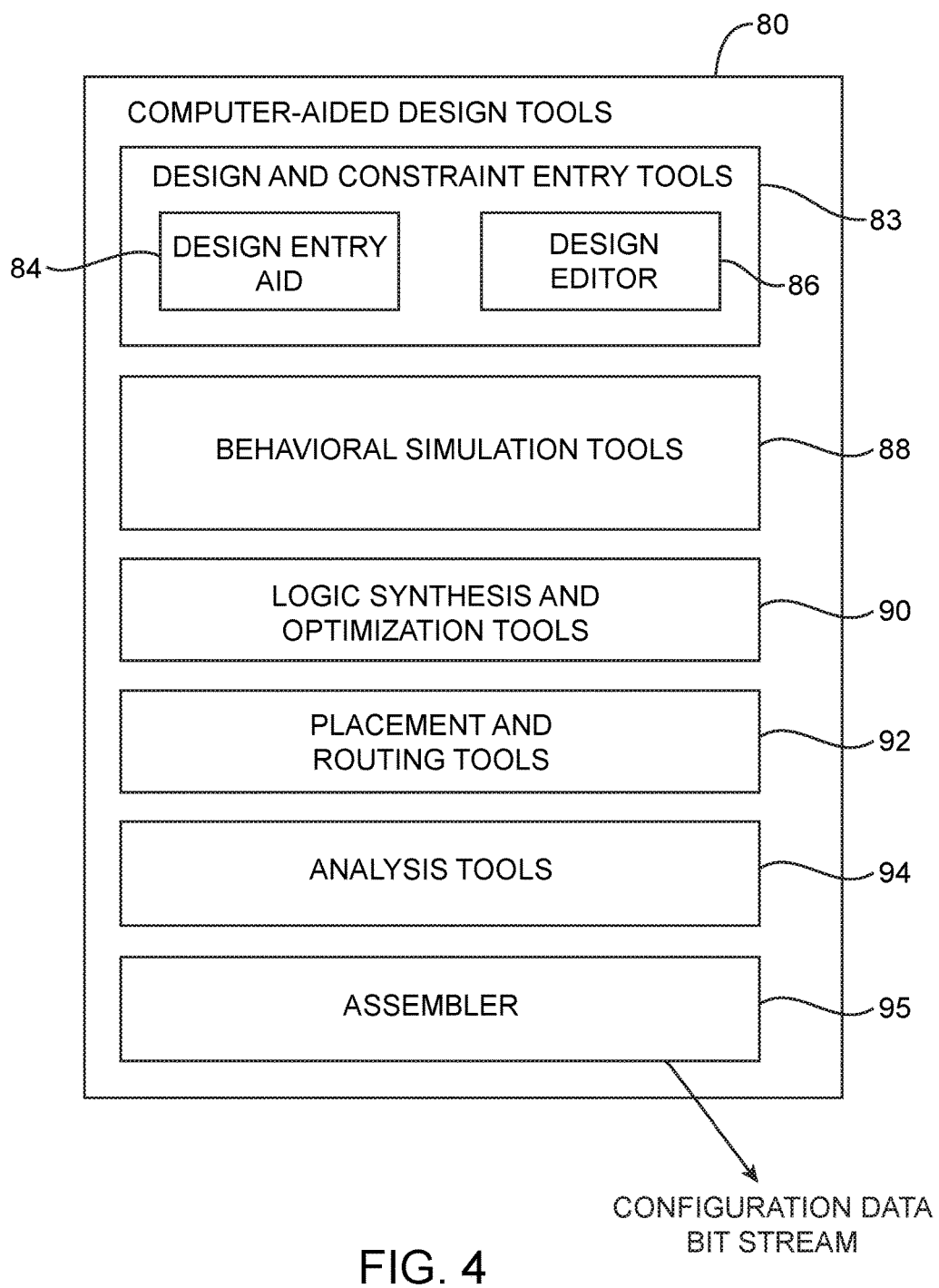
FIG. 4 is a diagram of illustrative computer-aided design (CAD) tools that may be used in a circuit design system in accordance with an embodiment.

Illustrative computer aided design tools 80 that may be used in a circuit design system such as circuit design system 72 of FIG. 3 are shown in FIG. 4.

The design process may start with the formulation of functional specifications of the integrated circuit design (e.g., a functional or behavioral description of the integrated circuit design). A circuit designer may specify the functional operation of a desired circuit design using design and constraint entry tools 83. Design and constraint entry tools 83 may include tools such as design and constraint entry aid 84 and design editor 86. Design and constraint entry aids such as aid 84 may be used to help a circuit designer locate a desired design from a library of existing circuit designs and may provide computer-aided assistance to the circuit designer for entering (specifying) the desired circuit design.

As an example, design and constraint entry aid 84 may be used to present screens of options for a user. The user may click on on-screen options to select whether the circuit being designed should have certain features. Design editor 86 may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 83 may be used to allow a circuit designer to provide a desired circuit design using any suitable format. For example, design and constraint entry tools 83 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 83 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 83 may allow the circuit designer to provide a circuit design to the circuit design system 72 using a hardware description language such as Verilog hardware description language (Verilog HDL), Very High Speed Integrated Circuit Hardware Description Language (VHDL), SystemVerilog, or a higher-level circuit description language such as OpenCL or SystemC, just to name a few. The designer of the integrated circuit design can enter the circuit design by writing hardware description language code with editor 86. Blocks of code may be imported from user-maintained or commercial libraries if desired.

After the design has been entered using design and constraint entry tools 83, behavioral simulation tools 88 may be used to simulate the functional performance of the circuit design. If the functional performance of the design is incomplete or incorrect, the circuit designer can make changes to the circuit design using design and constraint entry tools 83. The functional operation of the new circuit design may be verified using behavioral simulation tools 88 before synthesis operations have been performed using tools 83. Simulation tools such as behavioral simulation tools 88 may also be used at other stages in the design flow if desired (e.g., during logic synthesis). The output of the behavioral simulation tools 88 may be provided to the circuit designer in any suitable format (e.g., truth tables, timing diagrams, etc.).

Once the functional operation of the circuit design has been determined to be satisfactory, logic synthesis and optimization tools 90 may generate a gate-level netlist of the circuit design, for example using gates from a particular library pertaining to a targeted process supported by a foundry, which has been selected to produce the integrated circuit. Alternatively, logic synthesis and optimization tools 90 may generate a gate-level netlist of the circuit design using gates of a targeted programmable logic device such as device 10 (i.e., in the logic and interconnect resources of a particular programmable logic device product or product family).

Logic synthesis and optimization tools 90 may optimize the design by making appropriate selections of hardware to implement different logic functions in the circuit design based on the circuit design data and constraint data entered by the logic designer using tools 83. Tools 90 may optimize the design while ensuring that device constraints are satisfied. Such device constrains may include legality rules, timing constraints, or other constraints.

After logic synthesis and optimization using tools 90, the circuit design system may use tools such as placement and routing tools 92 to perform physical design steps (layout and routing operations). Placement and routing tools 92 are used to determine where to place each gate of the gate-level netlist produced by tools 90. For example, if two counters interact with each other, the placement and routing tools 92 may locate these counters in adjacent regions to reduce interconnect delays or to satisfy timing requirements specifying the maximum permitted interconnect delay. The placement and routing tools 92 create orderly and efficient implementations of circuit designs for any targeted integrated circuit (e.g., for a given programmable integrated circuit such as a field-programmable gate array (FPGA)).

Tools such as tools 90 and 92 may be part of a compiler suite (e.g., part of a suite of compiler tools provided by a programmable logic device vendor). In accordance with the present invention, tools such as tools 90, 92, and 94 may also include timing analysis tools such as timing estimators. This allows tools 90 and 92 to satisfy performance requirements (e.g., timing requirements) before actually producing the integrated circuit.

After a layout implementation of the desired circuit design has been generated using placement and routing tools 92, the implementation of the design may be analyzed and tested using analysis tools 94. After satisfactory optimization operations have been completed using tools 80 and depending on the targeted integrated circuit technology, tools 72 may produce a mask-level layout description of the integrated circuit. Assembler 95 may, for example, generate programming files such as the configuration data bit stream after the user logic design has been synthesized, placed, analyzed, and optimized. The configuration data may be used to program target device 10 (e.g., using configuration device 54 of FIG. 2). The example of FIG. 4 is merely illustrative. In general, tools 80 may include any desired tools arranged in any desired manner. Tools 88, 90, 92, and 94 may operate on a user logic design in any desired order.

System 72 may generate configuration data for implementing desired custom user logic 30 on programmable circuitry 18 of target device 10. The logic design identified by the configuration data may include execution stack instructions for control and processing circuitry 26 to perform calibration and initialization operations. The instructions may be stored on hardwired memory. In some scenarios (e.g., based on the requirements of the custom user logic to be implemented), the calibration and initialization instructions for control and processing circuitry 26 may exceed a capacity of the hardwired memory. In this scenario, logic design system 72 may generate configuration data for implementing expanded control and processing circuitry 32 on device 10 when loaded with the configuration data.

Figure 5:
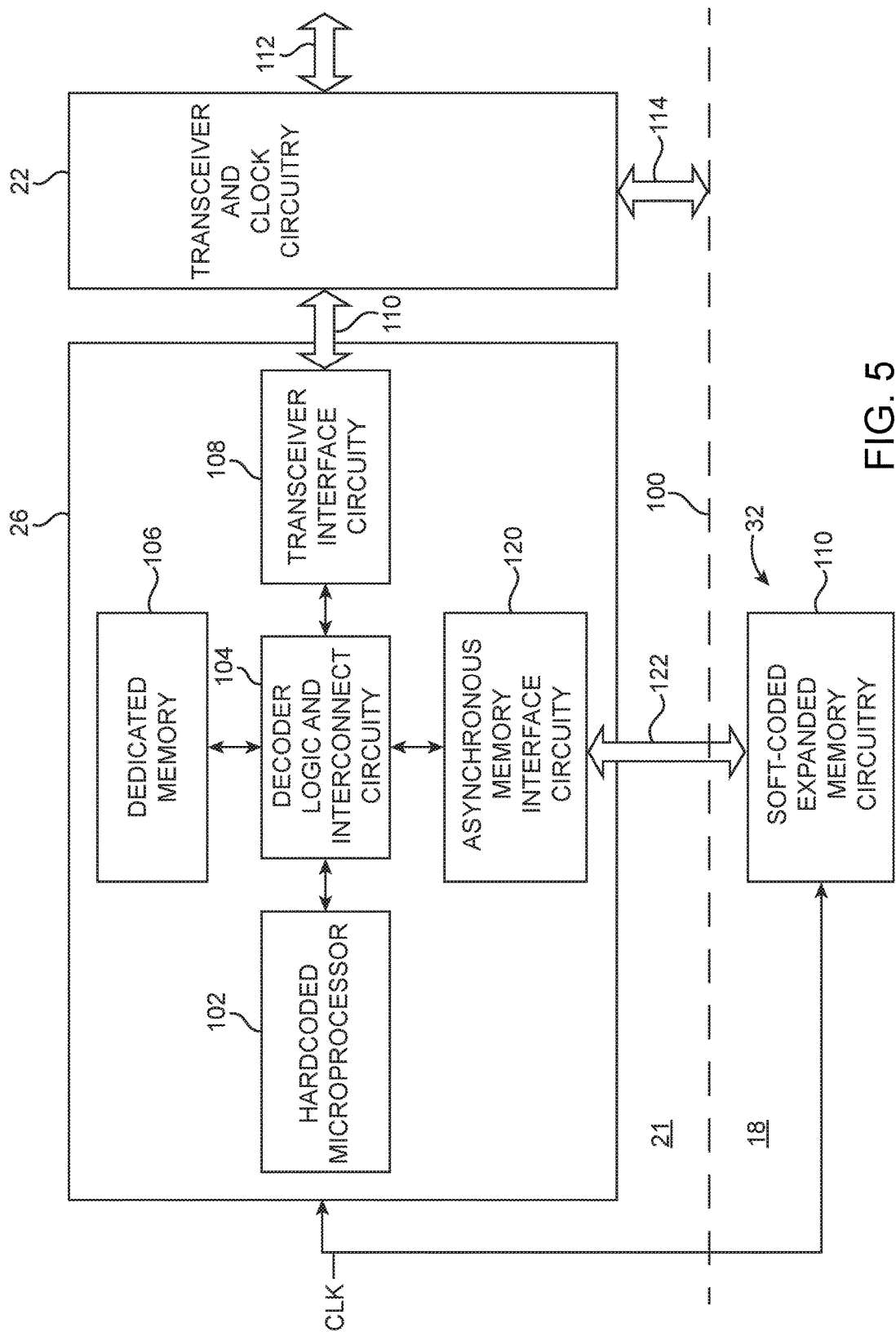
FIG. 5 is a diagram of an illustrative integrated circuit having expanded soft-coded memory circuitry in accordance with an embodiment.

FIG. 5 is an illustrative diagram showing how hardwired memory in control and processing circuitry 26 may be expanded onto programmable logic circuitry 18. As shown in FIG. 5, hardwired circuitry 21 (e.g., circuitry above dashed line 100) may interface with programmable soft logic circuitry 18 (e.g., circuitry below dashed line 100). Hardwired circuitry 21 may include control and processing circuitry 26 and transceiver and clocking circuitry 22. Circuitry 26 and 22 may be formed (hardwired) on integrated circuit 10 during fabrication of integrated circuit 10. When loaded with configuration data, soft logic circuitry 18 may be programmed to perform custom user logic functions such as functions 30 of FIG. 1.

In order to perform calibration and initialization operations on transceiver and clock circuitry 22, control and processing circuitry 26 may include hardwired processor circuitry 102. Hardwired processor circuitry 102 may be dedicated to performing initialization and calibration operations on transceiver and clock circuitry 22. Control and processing circuitry 26 may include decoder logic and interconnect circuitry 104 that serves as an interface for components within circuitry 26. Circuitry 104 may include decoder circuitry, an interconnect fabric of conductive lines and buses, switching circuitry, or any other desired circuitry for routing signals between components within control and processing circuitry 26.

Circuitry 26 may include hardwired memory circuitry 106 that interfaces with interconnect circuitry 104. Memory 106 may store execution stack instructions (code) that are processed (executed) by processor 102 when called. For example, memory 106 may include initialization and/or calibration instructions that are executed by processor 102 over interconnect 104. When executing the initialization instructions, processor 102 may perform initialization operations on transceiver and clock circuitry 22. When executing the calibration instructions, processor 102 may perform calibration operations on circuitry 22.

Processor 102 may sometimes be referred to herein as initialization and calibration processor 102, dedicated processor 102, or microprocessor 102. Because dedicated memory 106 stores instructions for execution by processor 102, dedicated memory 106 may sometimes be referred to herein as microprocessor memory 106 or processor memory 106. The calibration and initialization code may be generated by logic design equipment 72 during design of custom user logic 30. The calibration and initialization code may be loaded onto device 10 and stored on hardwired memory 106 when the configuration data is loaded onto programmable logic 18 for implementing custom user logic 30. If desired, memory 106 may store data that is not executed by processor 102. Such data may, for example, be provided to or received from circuitry 22 during normal operation of device 10.

Control and processing circuitry 26 may include circuitry for interfacing with transceiver and clock circuitry 22 such as transceiver interface circuitry 108 (sometimes referred to as a transceiver component access bridge). Transceiver interface circuitry 108 may be, for example, a memory map interface or any other desired interface that communicates with transceiver and clock circuitry 22 over path 110. Transceiver and clock circuitry 22 may communicate with other hardwired components in circuitry 21 and/or with external devices over input/output paths 12 via communications path 112. Circuitry 22 may transmit data to other circuitry over path 112 and may receive circuitry over path 112. For example, path 112 may include input paths 26 and output paths 24 of FIG. 1. If desired, transceiver and clock circuitry 22 may communicate with soft logic in programmable circuitry 18 over communications path 114.

As memory 106 is hardwired into integrated circuit 10 during fabrication of integrated circuit 10, memory 106 may have a fixed storage capacity (size). For example, memory 106 may have a 32 kilobyte capacity, a 20 kilobyte capacity, or any other desired capacity. The size of the initialization and calibration instructions stored on memory 106 may be determined by logic design equipment 72 when designing and synthesizing custom user logic 30. The size of the code may be dependent upon the particular custom user logic to be implemented and/or on how the logic designer intends to use hardwired transceiver and clock circuitry 22.

In practice, scenarios may arise where hardwired memory 106 does not have sufficient capacity to store all of the calibration and initialization instructions (e.g., in scenarios where a relatively large number of complex initialization and calibration operations are to be performed). In these scenarios, a portion of programmable soft logic 18 may be used to form an expanded microprocessor memory for storing the initialization and calibration instructions. As shown in FIG. 5, soft-coded expanded memory circuitry 110 may be formed on programmable logic circuitry 18. Expanded memory circuitry 110 may, for example, be implemented on programmable circuitry 18 when the configuration data for implementing custom user logic 30 is loaded onto device 10. Expanded memory circuitry 110 may be instantiated within the configuration data by design system 72 when it is determined that dedicated memory 106 will not be sufficiently large for storing the required calibration and initialization instructions.

Expanded soft-coded memory circuitry 110 may store initialization instructions or code that would not otherwise fit on hardwired memory 106. For example, if the calibration and initialization instructions to be loaded on dedicated memory 106 are 36 kilobytes in size but hardwired memory 106 only has a 30 kilobyte capacity, the first 30 kilobytes of the instructions may be stored on hardwired memory 106 whereas the remaining six kilobytes of the instructions may be stored on expanded memory 110. In general, the instructions may be divided between hardcoded memory 106 and soft-coded memory 110 in any desired manner (e.g., half of the instructions may be loaded onto each memory, all of the instructions may be loaded onto the expanded memory, a first amount may be loaded onto the hardwired memory such that portion of the capacity of the hardwired memory remains for storing data, etc.).

Expanded memory circuitry 110 may have any desired capacity. In one suitable arrangement, the capacity of memory circuitry 110 may be generated to exactly fit the remaining instructions that do not fit on hardwired memory 106 (e.g., memory 110 may have a six kilobyte capacity when the instructions exceed the capacity of dedicated memory 106 by six kilobytes) in order to maximize resources on programmable logic circuitry 18 for use by custom user logic 30. In another suitable arrangement, expanded memory circuitry 110 may have additional capacity for storing any other desired data during operation of device 10.

Hardwired control and processing circuitry 26 may include memory interface circuitry 120 for communicating with expanded memory circuitry 110 over path 122. Memory interface circuitry 120 may, if desired, issue read and write commands and provide corresponding memory addressing signals and write data to memory 110. Similarly, interface 120 may read data (instructions) from memory 110 for execution on processor 102. Because interface 120 and path 122 serve as an interface between expanded memory 110 and hardcoded processor 102 (e.g., an interface that allows hardcoded processor 102 to interact with expanded soft-coded memory), interface 120 and path 122 may sometimes be referred to collectively herein as expanded memory interface circuitry. Hardcoded processor 102 may execute the instructions stored on dedicated memory 106 over interconnect circuitry 104 and may execute the instructions stored on expanded memory 110 over interconnect 104, interface 120, and path 122. In this scenario, decoder logic 104 may, if desired, be programmed to direct memory access requests by processor 102 to expanded memory 110 through interconnect 122. The instructions stored on memory 106 and/or memory 110 may instruct processor 102 when to execute instructions on the other memory circuit if desired (e.g., the last instruction on hardwired memory 106 to be executed by processor 102 may instruct processor 102 to begin executing instructions on soft-coded memory 110, etc.).

Memory interface circuitry 120 may be, for example, asynchronous memory interface circuitry. In some scenarios, hardwired control and processing circuitry 26 operates within a first clock domain (e.g., the components of circuitry 26 are clocked using a first clock signal at a first clock frequency) whereas expanded memory 110 operates in a second clock domain (e.g., memory 110 is clocked using a second clock signal at a second clock frequency). In these scenarios, interface circuitry 120 may serve as a clock domain crossing bridge that converts (translates) signals between the two clock domains for conveying to and from interconnect circuitry 104. In other examples, circuitry 26 and circuitry 110 may be clocked using the same clock signal. Such an example is shown in FIG. 5, where circuitry 26 and memory 110 are both clocked using clock signal CLK. Clock signal CLK may, for example, be specified by a logic designer for clocking custom logic functions 30 or may, in general, be any other desired clock signal.

The example of FIG. 5 is merely illustrative. If desired, multiple hardcoded processors 102 may be formed in circuitry 26. Circuitry 26 may include any other desired hardwired circuitry. If desired, circuitry 26 may perform operations other than calibration and initialization operations.

By storing some of the initialization and calibration instructions for hardcoded processor 102 in soft-coded expanded memory 110, integrated circuit 10 may store and execute more calibration and/or initialization operations than integrated circuits having only hardwired microprocessor memory 106. In some scenarios, it may be difficult to allocate the instructions for a processor across two different memory regions (e.g., across both hardwired memory 106 and soft-coded memory 110). If desired, expanded circuitry 32 in programmable logic 18 may include soft-coded processor circuitry.

Figure 6:
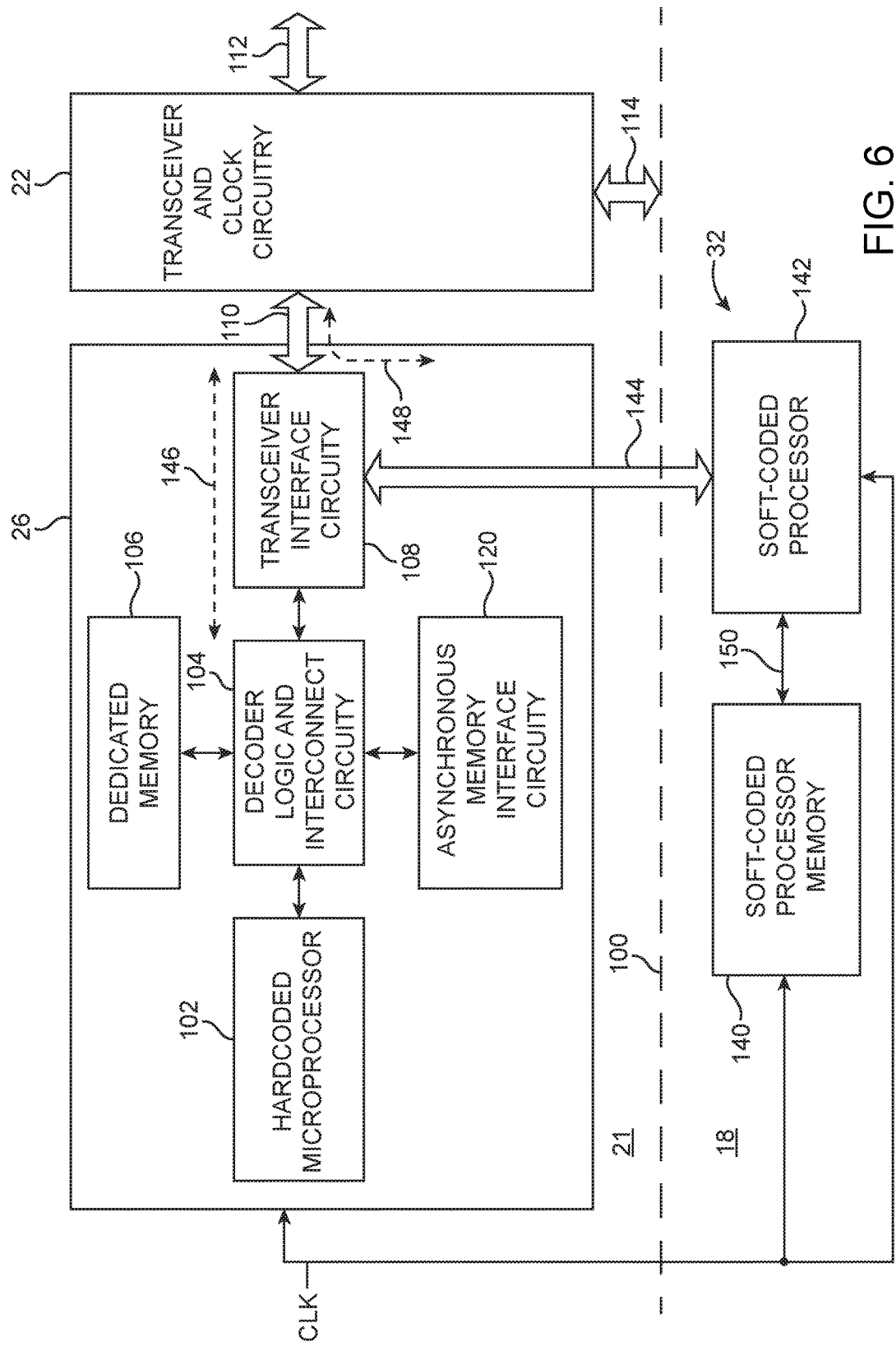
FIG. 6 is a diagram of an illustrative integrated circuit having soft-coded processor circuitry and corresponding soft-coded memory circuitry in accordance with an embodiment.

FIG. 6 is an illustrative diagram showing how programmable logic circuitry 18 may include expanded soft-coded processor circuitry. As shown in FIG. 6, a portion of programmable logic circuitry 18 may be used to form a soft-coded processor such as processor 142. In addition, a portion of programmable logic circuitry 18 may be used to form soft-coded memory 140 for processor 142. Soft-coded processor 142 may execute instructions/code stored on soft-coded processor memory 140 over path 150. Soft-coded memory 140 and processor 142 may be implemented on programmable logic 18 when integrated circuit 10 is loaded with configuration data (e.g., a configuration data bit stream) for implementing custom user logic 30.

In the arrangement of FIG. 6, soft-coded processor memory 140 may store a set of calibration and initialization instructions for execution by soft-coded processor 142. The instructions stored on memory 140 may, if desired, be different from the instructions stored on hard-coded memory 106. For example, a first subset of the calibration and initialization instructions may be stored on hard-coded memory 106 for execution by hard-coded processor 102 whereas a remainder of the calibration and initialization instructions may be stored on soft-coded memory 140 for execution by soft-coded processor 142. If desired, the subset of the instructions stored on hard-coded memory 106 may have a higher priority than the set of instructions stored on soft-coded memory 140. The higher priority instructions may, for example, be performed prior to performing the lower priority instructions. As an example, the instructions stored on hard-coded memory 106 may instruct processor 102 to perform calibration and initialization operations that must be performed before those identified by instructions stored on soft memory 140. In this way, integrated circuit 10 may avoid accessing two different memories using a single microprocessor for executing calibration and initialization instructions.

As one example, higher priority instructions stored on hard-coded memory 106 may include transceiver enable settings (e.g., settings identifying which transceivers in circuitry 22 to power on or enable) whereas lower priority instructions stored on soft-coded memory 140 may include signal phase or frequency settings. In this example, circuitry 26 may not be able to apply the phase or frequency settings until one or more transceivers in circuitry 22 have been turned on (enabled or activated). In general, any desired settings may be controlled by instructions formed on either memory circuit.

Soft-coded processor memory 140 may be any desired size. For example, memory 140 may be the same size or larger than hardwired memory 106 (e.g., memory 140 may have at least the same capacity as memory 106). Soft-coded processor 142 may replicate the function of processor 102. For example, soft-coded processor 142 may be a copy of processor 102 that is formed on programmable logic 18. If desired, soft-coded processor 142 may be an optimized version of hard-coded processor 102 (e.g., a faster or more efficient version of processor 102). For example, over time, updates or technology improvements may increase the potential speed of hard-coded processor 102. However, since hard-coded processor 102 is hardwired into integrated circuit 10, hard-coded processor 102 cannot be reconfigured to take advantage of such improvements. In contrast, soft-coded processor 142 is loaded onto programmable logic 18 as needed and can be configured to incorporate such technology updates over time. If desired, soft-coded processor 142 may be added in response to a user input (e.g., a logic designer instructing the system to include the soft-coded processor), based on an autonomous trigger (e.g., when the system determines that the design will only work or will have improved performance if a soft-coded processor is added), or in response to reception of an updated design for the hard-coded processor.

Soft-coded processor 142 may be coupled to hardwired transceiver interface circuitry 108 over communications path 144. Transceiver interface circuitry 108 may serve as both an interface between hardwired interconnect fabric 104 and soft-coded processor 142 and an interface between hardwired interconnect fabric 104 and transceiver and clock circuitry 22. Transceiver interface circuitry 144 may include switching circuitry such as one or more arbitrating multiplexers. The switching circuitry may grant exclusive access to transceiver and clock circuitry 22 to one of processor 102 and processor 142 at a given time. For example, the switching circuitry in interface 108 may route signals between hardwired processor 102 and circuitry 22 as shown by path 146 during first time periods and may route signals between soft-coded processor 142 and circuitry 22 as shown by path 148 during second time periods that are different from the first time periods.

In one suitable arrangement, during calibration and initialization operations, interface 108 may route signals between hard-coded processor 102 and circuitry 22 until processor 102 has finished executing the corresponding high-priority calibration and initialization instructions stored on hardwired memory 106. Once hard-coded processor 102 has finished executing the instructions stored on hardwired memory 106, interface 108 may change configurations to route signals between soft-coded processor 142 and circuitry 22 until processor 142 has finished executing the corresponding lower-priority calibration and initialization instructions stored on soft-coded memory 140. If desired, soft-coded processor 142 may continue to route signals to circuitry 22 or perform periodic calibration operations on circuitry 22 until integrated circuit 10 is reset or powered off.

Figure 7:
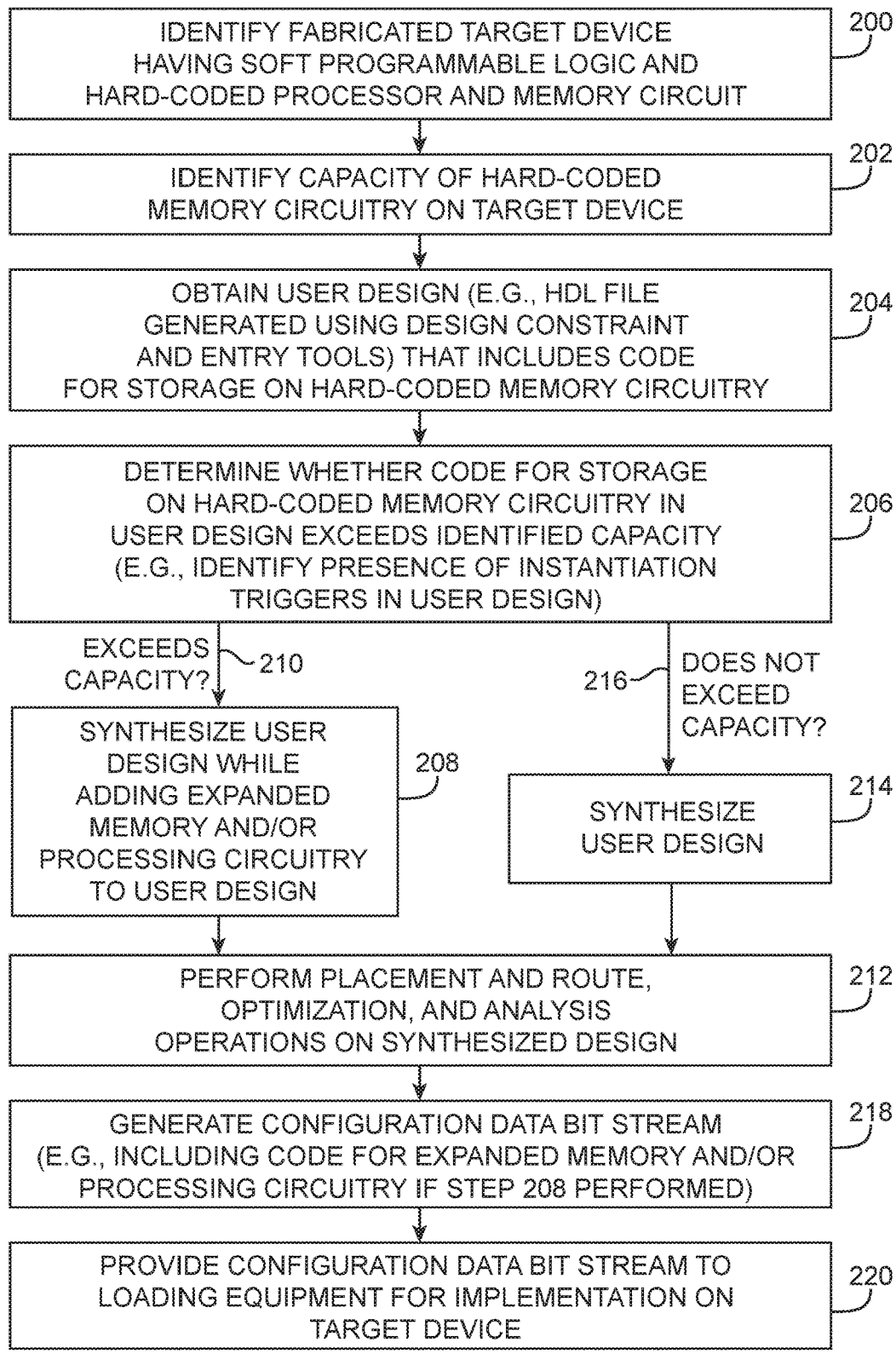
FIG. 7 is a flow chart of illustrative steps that may be performed by a logic design system to generate configuration data for loading onto a programmable integrated circuit in accordance with an embodiment.

FIG. 7 is a flow chart of illustrative steps that may be performed by logic design system 72 (FIG. 2) for generating and implementing expanded soft-coded memory 110 (FIG.

5), soft-coded processor memory 140, and/or soft-coded processor 142 (FIG. 6) on target integrated circuit device 10.

At step 200, computer-aided design tools 80 (FIG. 4) on circuit design system 72 may identify a particular integrated circuit device 10 as a target device for programming. Target device 10 may include hard-coded circuitry 21 and programmable soft-coded circuitry 18. Hard-coded circuitry 21 on the target device may include hard-coded processor memory 106 for storing instructions that are executed by hard-coded initialization and calibration processor 102.

At step 202, tools 80 may identify a capacity of hard-coded memory 106 in the identified target device 10. For example, tools 80 may identify that memory 106 has a 32 kilobyte capacity, a 20 kilobyte capacity, a capacity of greater than 32 kilobytes, a capacity between 20 and 32 kilobytes, a capacity of less than 20 kilobytes, or any other desired capacity.

At step 204, logic design equipment 72 may obtain a user logic design for target device 10. The user design may be obtained using design constraint and entry tools 83 (FIG. 4). The user design may include custom user logic for implementing on programmable core 18 and instructions for storing on hard-coded memory 106. The user design may be, for example, an HDL file or other file-type through which the logic design is specified.

At step 206, logic design equipment 72 may determine whether the size of the code for storage on hard-coded memory 106 (e.g., as obtained at step 204) exceeds or will exceed the capacity of hard-coded memory 106 (e.g., as identified at step 202). If the size of the code does not exceed the capacity of hard-coded memory 106, processing may proceed to step 214 as shown by path 216.

At step 214, logic synthesis and optimization tools 90 may perform logic synthesis (compile) operations on the identified user design. In this scenario, programmable logic circuitry 18 on the target device is not configured to include expanded control and processing circuitry 32 (e.g., memory 110, memory 140, and soft-coded processor 142 are omitted from the target device). Processing may subsequently proceed to step 212.

At step 212, placement and design tools 80 perform optimization operations (e.g., using tools 90), placement and routing operations (e.g., using tools 92), and analysis operations (e.g., using tools 94) on the synthesized user design. If the size of the code for storage on hard-coded memory 106 exceeds the capacity of hard-coded memory 106, processing may proceed to step 208 as shown by path 210.

At step 210, tools 90 may synthesize the user logic design while also incorporating soft-coded processor memory 140, soft-coded processor 142, and/or expanded memory 110 in the logic design for implementation on programmable circuitry 18. For example, the user's logic design code may be combined with library components and with code components for implementing soft-coded circuitry 140, 142, and/or 110 and translated into a netlist representation of the components.

Processing may subsequently proceed to step 212 to perform placement and route, optimization, and analysis operations on the synthesized design (including soft-coded initialization and calibration components 140, 142, and/or 110). For example, the components in the netlist representation may be mapped onto the available resources of programmable circuitry 18 and connected in a manner that meets design constraints specified by the user and/or manufacturer of device 10.

At step 218, logic design system 72 may generate a configuration data bit stream based on the netlist file generated at step 212. The configuration data bit stream may be generated by combining the placed and routed logic design with corresponding initialization and calibration instructions for storing on memory 106, 110, and/or 140.

At step 220, logic design system 72 may provide the generated configuration data bit stream to configuration device 54 (FIG. 2) for implementation on device 10. Device 54 may load the configuration data onto target device 10 so that target device 10 implements the logic design identified by the configuration data bit stream (e.g., including the soft-coded initialization and calibration components 140, 142, and/or 110 in scenarios where step 208 is performed). Device 10 may load corresponding initialization and calibration code (instructions) identified in the configuration data bit stream onto hard-coded memory 106, soft-coded memory 140, and/or expanded memory 140 before, during, or after loading the configuration data onto device 10. After device 10 has been configured using the configuration data bit stream and the corresponding initialization and calibration instructions have been loaded, device 10 may be powered on.

Figure 8:
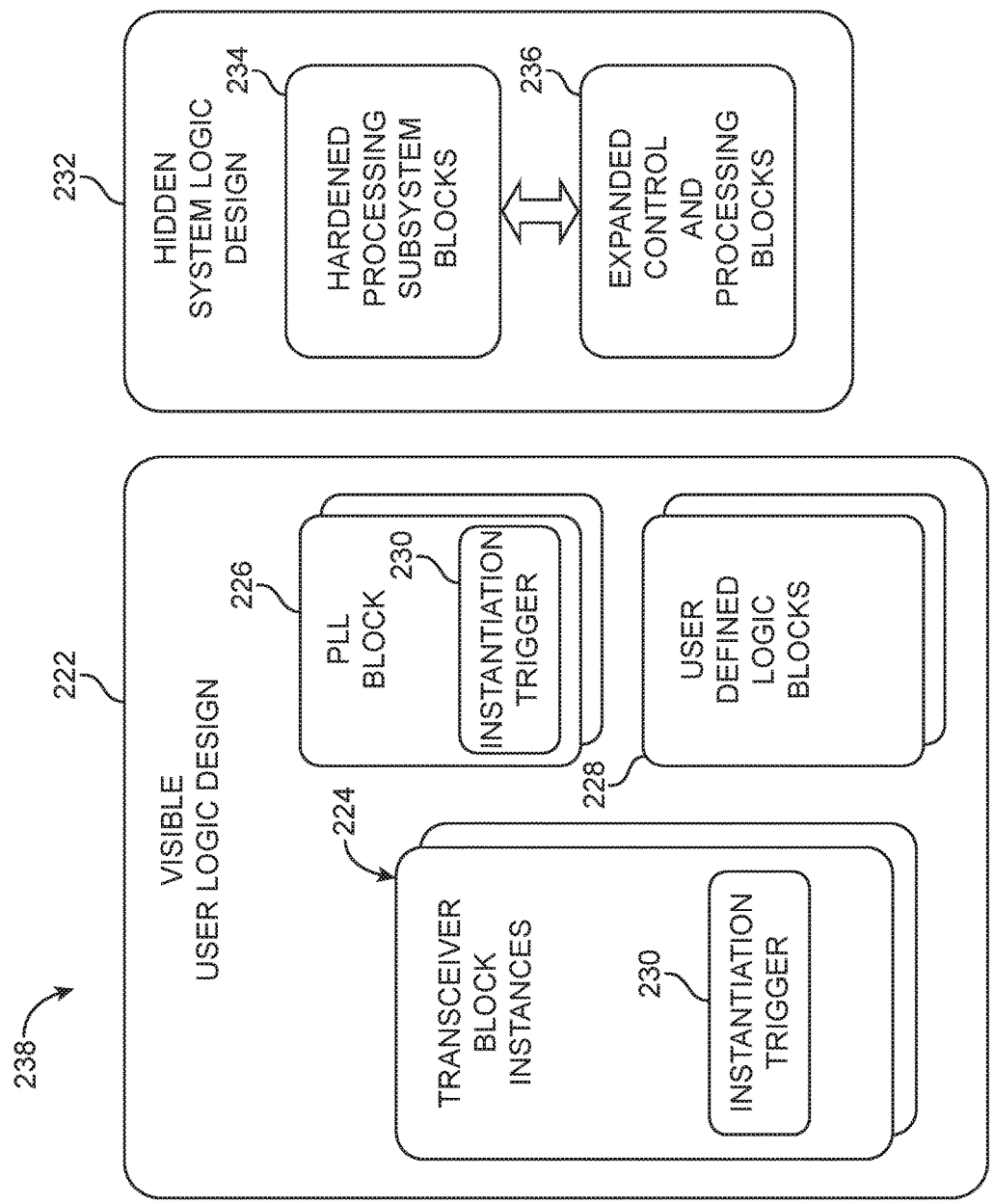
FIG. 8 is a diagram showing how a logic design system may generate expanded soft-coded memory and processing circuitry while hiding the presence of the soft-coded circuitry from a user of the logic design system in accordance with an embodiment.

FIG. 8 is an illustrative diagram showing how logic synthesis tools 90 of FIG. 4 may incorporate expanded soft logic 32 into the corresponding user design. As shown in FIG. 8, logic design 238 may be processed by logic synthesis tools 90. Design 238 may include a visible portion 222 that is visible to a user or logic designer operating equipment 72. Visible design portion 222 may include transceiver instances 224, clock (PLL) instances 226, and user logic instances 228 that are instantiated (defined) by the user (e.g., based on user input provided to equipment 72). During synthesis, synthesis tools 90 may use transceiver instances 224 and PLL blocks 226 to enable hard-coded transceivers and clock circuits in the integrated circuit and to configure the interactions of custom user logic 30 and transceiver circuitry 22 (including generation of initialization and calibration code for storage on memory 106). During synthesis, tools 90 may use user-defined instances 228 to synthesize custom user logic 30.

Design equipment 72 may autonomously identify when instances 224 and 226 in user-visible design portion 222 will result in the generation of instructions for storage on memory 106 that exceed the capacity of hard-coded memory 106 (e.g., while processing step 202 of FIG. 7). When equipment 72 detects that the instructions exceed the capacity of memory 106, equipment 72 may place instantiation triggers 230 within transceiver instances 224 and/or clocking instances 226.

Synthesis tools 90 may process visible user logic design 222 when performing synthesis on the design. Synthesis tools 90 may detect instantiation triggers 230 and, in response to detecting the triggers, may generate hidden system logic portion 232 of design 238. Hidden system design 232 may include hardened processing subsystem instance 234 and expanded control and processing instances 236. During synthesis, tools 90 may use hardened processing subsystem instances 234 to generate calibration and initialization code that is split across memory 106 and memory 110 and memory 106 or that is provided to memory 106 and memory 140. During synthesis, tools 90 may process user instance 236 to synthesize soft-coded memory 140, soft-coded processor 142, and/or expanded memory 110.

Design 232 may be hidden, invisible, or obfuscated from the logic designer or user of system 72 so that the user is not aware that expanded soft-coded circuitry 32 is being added to programmable logic 18. In this way, the user need not consume time and energy to change the custom logic 18 even though large instructions and calibration instructions that otherwise would not fit on hard-coded memory 106 are being used (e.g., a greater number of more complex initialization and calibration operations may be provided relative to scenarios where expanded circuitry 32 is not implemented, without any extra effort or intervention from the logic designer).

Figure 9:
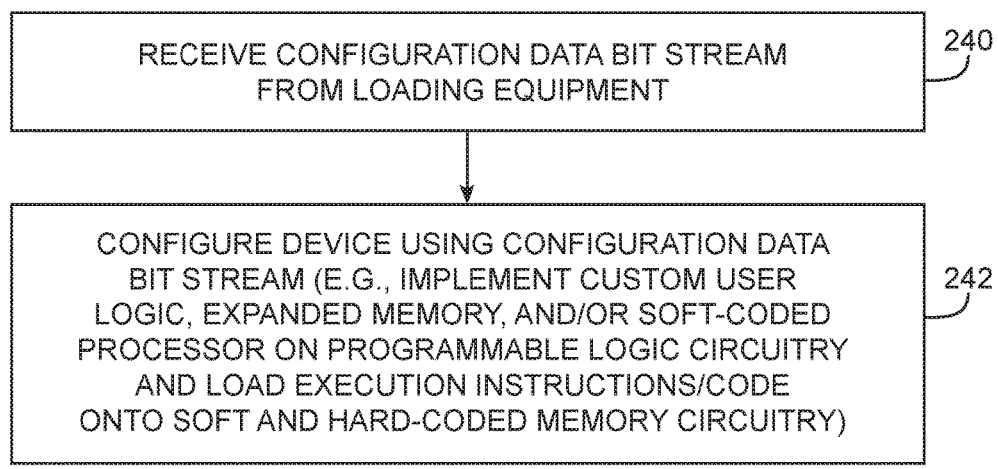
FIG. 9 is a flow chart of illustrative steps that may be performed by a programmable integrated circuit to load configuration data that implements soft-coded memory and processing circuitry on the integrated circuit in accordance with an embodiment.

FIG. 9 is a flow chart of illustrative steps that may be performed by target programmable logic device 10 for implementing the configuration data bit stream generated by design system 72. The steps of FIG. 9 may, for example, be performed after or concurrent with processing step 220 of FIG. 7.

At step 240, device 10 may receive the configuration data bit stream from loading device 54.

At step 242, device 10 may be configured to implement the logic design and corresponding soft-coded expanded circuitry 32 identified by the configuration data bit stream. For example device 10 may be configured to implement expanded memory 110 (in scenarios where the arrangement of FIG. 5 is used) or to implement memory 140 and processor 142 (in scenarios where the arrangement of FIG. 6 is used).

Dedicated memory 106 on hardwired circuitry 21 of target device 10 may load a set of initialization and calibration instructions received from device 54 (e.g., as identified by the configuration data). An additional set of initialization and calibration instructions may be loaded onto soft-coded memory 140 or expanded memory 110. When device 10 is powered up, hard-coded circuitry 21 may be fully operational (e.g., awake, booted-up, or fully powered on) prior to programmable logic circuitry 18 (e.g., programmable circuitry 18 may only become awake after circuitry 21 has become awake).

If desired, the set of instructions loaded onto hard-coded memory 106 may have a higher priority than the set of initialization and calibration instructions loaded onto soft-coded memory 140 or 110 (e.g., the instructions loaded onto memory 106 may have a higher priority that requires the instructions to be performed before other, lower priority instructions). This may allow, for example, hard-coded processor 102 to perform higher priority initialization and calibration operations while programmable logic circuitry 18 is still in the process of waking up (e.g., because hard-coded processor 102 becomes fully operational after power-up before soft-coded components 110, 140, and 142). Once programmable circuitry 18 becomes fully operational, lower priority instructions stored on soft-coded memory 110 or 140 may be executed.

This example is merely illustrative. If desired, instructions may be loaded onto dedicated memory 106. These instructions may be processed to perform a first initialization of transceiver and clock circuitry 22, and circuitry 22 may be used to convey configuration data to programmable logic circuitry 18 to implement circuitry 30 and/or 32 and to convey the instructions for storage on soft-coded memory circuitry 110 and 140 across device 10 (e.g., over path 114). The instructions stored on the soft-coded memory may subsequently be processed to complete initialization and calibration of transceiver and clock circuitry 22.

Figure 10:
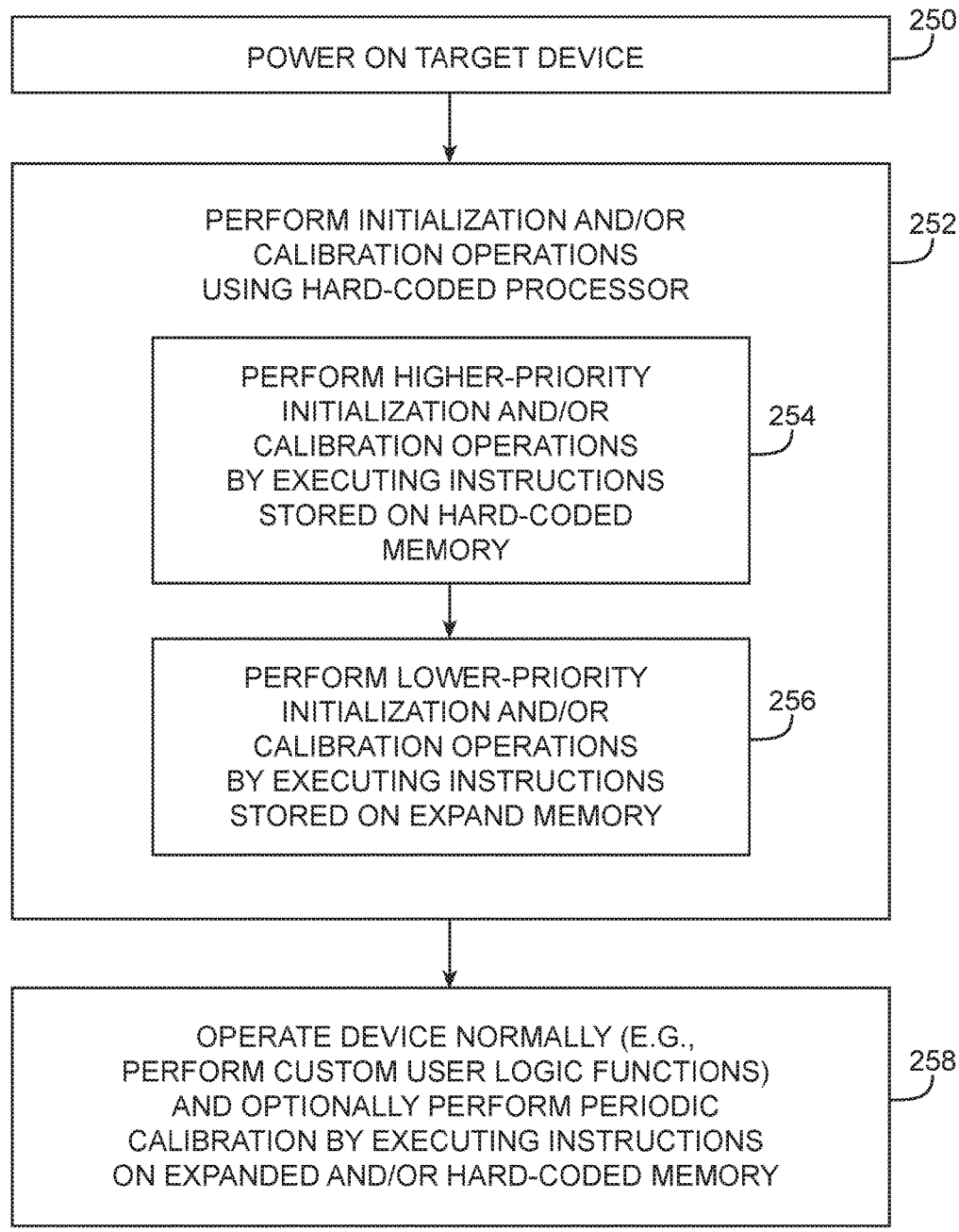
FIG. 10 is a flow chart of illustrative steps that may be performed a programmable integrated circuit to initialize and calibrate hard-coded transceiver circuitry using instructions stored on hard-coded memory circuitry and expanded soft-coded memory circuitry in accordance with an embodiment.

FIG. 10 is a flow chart of illustrative steps that may be processed by programmable device 10 in performing initialization and calibration operations using expanded memory 110 (FIG. 5). The steps of FIG. 10 may, for example, be performed after processing step 242 of FIG. 9.

At step 250, integrated circuit 10 may be powered on. After power-up, transceiver circuitry 22 may need to be initialized (e.g., using corresponding initialization settings). Circuitry 22 may also need to be calibrated to ensure that circuitry 22 is operating correctly.

At step 252, processor 102 may perform initialization and/or calibration operations on transceiver circuitry 252. Processor 102 may perform the initialization and calibration operations by executing instructions that are stored on dedicated memory 106 (e.g., by conveying signals between processor 102 and memory 106 via interconnect 104) and soft-coded expanded memory 110 (e.g., by conveying signals between processor 102 and memory 110 via interconnect 104 and asynchronous memory interface 120).

If desired, higher priority calibration and initialization instructions may be stored on hard-coded memory 106 whereas lower priority instructions are stored on soft-coded memory 110. Processor 102 may execute the instructions stored on dedicated memory 106 (at step 254) prior to executing instructions stored on soft-coded memory 110 (at step 256). This may allow, for example, higher priority initialization and calibration operations to be performed while programmable circuitry 18 is still waking up after power on (thereby saving boot-up time relative to scenarios where processor 102 waits for circuitry 21 and circuitry 18 to be fully awake before initialization).

At step 258, device 10 may be operated normally. For example, custom user logic 30 may perform the corresponding custom user logic functions (e.g., using data conveyed to and from transceivers 22 as initialized and calibrated while processing step 252). If desired, hard-coded processor 102 may perform periodic or occasional calibration operations on transceivers 22 using instructions stored on memory 106 and/or 110 during normal operation of the device. This process may continue until the device is reset or powered off, after which the device may need to be initialized and calibrated again.

Figure 11:
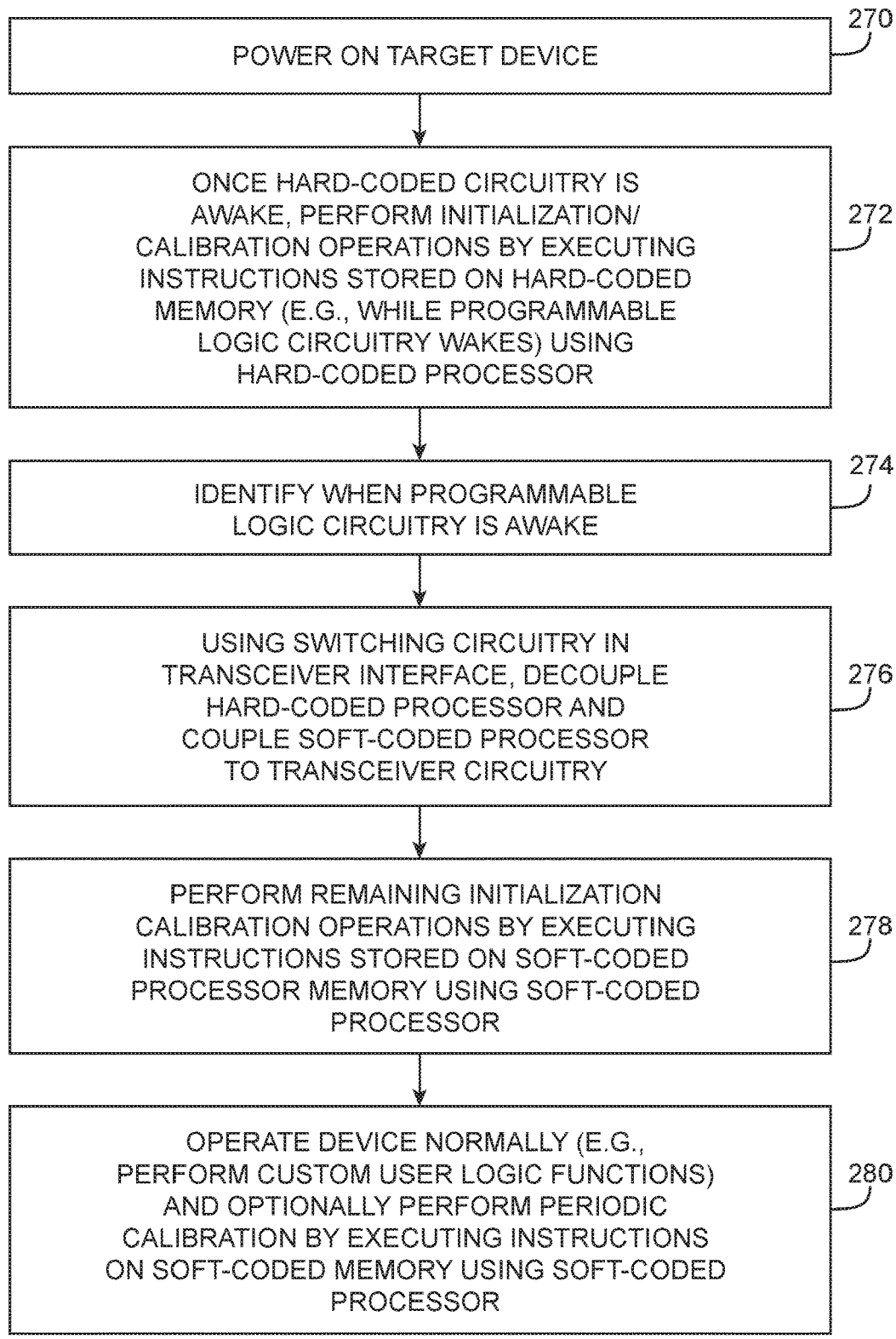
FIG. 11 is a flow chart of illustrative steps that may be performed by a programmable integrated circuit to initialize and calibrate hard-coded transceiver circuitry using hard-coded and soft-coded processing circuitry in accordance with an embodiment.

FIG. 11 is a flow chart of illustrative steps that may be processed by programmable device 10 in performing initialization and calibration operations using soft-coded processor memory 140 and soft-coded processor 142 (FIG. 6). The steps of FIG. 11 may, for example, be performed after processing step 242 of FIG. 9.

At step 270, integrated circuit 10 may be powered on. After power on, transceiver circuitry 22 may need to be initialized so that circuitry 22 is set to perform desired data transmission and reception operations. Circuitry 22 may also need to be calibrated to ensure that circuitry 22 is operating correctly. After power on, hard-coded circuitry 21 may become fully operational (awake) prior to programmable circuitry 18.

Once hard-coded circuitry 21 has become awake, at step 272, hard-coded processor 102 may perform initialization and/or calibration operations on transceiver circuitry 22 by executing the set of instructions stored on hard-coded memory circuitry 106. During the operations of step 272, switching circuitry in transceiver interface 108 may be set to a first state at which signals are conveyed over path 146 to initialize transceivers 22 (e.g., to set transceivers 22 to the desired operational settings, to check and calibrate the performance of transceivers 22, etc.). Programmable circuitry 18 may be in the process of waking up or becoming fully operational after power up while processor 102 executes the instructions stored on memory 106. The instructions stored on memory 106 may, if desired, be higher priority than the instructions stored on soft-coded memory 140.

At step 274, circuitry 102 may identify when programmable circuitry 18 has become fully operational (awake). For example, circuitry 102 may receive a control signal from one or more components of programmable circuitry 18 that identify that programmable circuitry 18 is awake.

At step 276, switching circuitry in transceiver interface 108 may decouple hardcoded processor 102 from transceivers 22 and may couple soft-coded processor 142 (e.g., path 144) to transceivers 22. For example, switching circuitry in transceiver interface 108 may be set to a second state at which signals are conveyed over path 148 to transceivers 22 (e.g., to set transceivers 22 to the desired operational settings, to check and calibrate the performance of transceivers 22, etc.).

At step 278, soft-coded processor 142 may perform initialization and/or calibration operations on transceiver circuitry 22 by executing the set of instructions stored on soft-coded memory circuitry 140. The instructions stored on memory 106 may, if desired, be lower priority than the instructions stored on soft-coded memory 140.

Once transceivers 22 have been completely initialized and calibrated, device 10 may continue to operate normally (step 280). For example, custom user logic 30 may perform corresponding custom user logic functions (e.g., using data conveyed to and from transceivers 22 as initialized and calibrated while processing steps 272 and 278). If desired, hard-coded processor 102 may perform periodic or occasional calibration operations on transceivers 22 using instructions stored on memory 140 during normal operation of the device. This process may continue until the device is reset or powered off, after which the device may need to be initialized and calibrated again.

The example of FIG. 11 is merely illustrative. If desired, step 274 may be omitted and step 276 may begin after processor 102 has finished processing each of the instructions stored on hard-coded memory 106 or step 276 may begin after passage of a predetermined amount of time. In the example of FIG. 11, hard-coded processor 102 has no access to transceivers 22 after soft-coded processor 142 has been switched into use. If desired, switching circuitry 108 may switch between processors 102 and 142 so that each processor may perform periodic calibration operations on transceivers 22.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs). Examples of programmable logic devices include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention. The foregoing embodiments may be implemented individually or in any combination.

What is claimed is:

1. An integrated circuit, comprising:
    hard-coded processor circuitry;
    hard-coded memory circuitry operable to store a first set of instructions;
    transceiver circuitry;
    programmable logic circuitry having first and second programmable logic regions, the first programmable logic region forming soft-coded memory circuitry operable to store a second set of instructions, the second programmable logic region forming custom user logic circuitry; and
    expanded memory interface circuitry coupled between the hard-coded processor circuitry and the soft-coded memory circuitry, wherein the hard-coded processor circuitry is operable to control settings of the transceiver circuitry by executing the first set of instructions stored on the hard-coded memory circuitry and by executing the second set of instructions stored on the soft-coded memory circuitry, and wherein the first set of instructions includes an instruction that references the second set of instructions.

2. The integrated circuit defined in claim 1, wherein the hard-coded processor circuitry control initialization settings of the transceiver circuitry by executing at least some instructions of the first set of instructions stored on the hard-coded memory circuitry.

3. The integrated circuit defined in claim 2, wherein the hard-coded processor circuitry is operable to control the initialization settings of the transceiver circuitry by executing at least some instructions of the second set of instructions stored on the soft-coded memory circuitry.

4. The integrated circuit defined in claim 1, wherein the hard-coded processor circuitry is operable to execute the first set of instructions prior to executing the second set of instructions.

5. The integrated circuit defined in claim 4, wherein the hard-coded processor circuitry is operable to execute the first set of instructions while the soft-coded memory circuitry powers on.

6. The integrated circuit defined in claim 1, wherein the hard-coded processor circuitry comprises one of a plurality of processors on the integrated circuit.

7. The integrated circuit defined in claim 1, further comprising:
    transceiver component access bridge circuitry coupled between the hard-coded processor circuitry and the transceiver circuitry.

8. The integrated circuit defined in claim 1, wherein the expanded memory interface circuitry comprises asynchronous memory interface circuitry operable to convert signals between a first clock domain associated with the soft-coded memory circuitry and a second clock domain associated with the hard-coded processor circuitry.

9. The integrated circuit defined in claim 1, wherein the programmable logic circuitry comprises:
    a first set of configuration random access memory cells operable to store configuration data for implementing the soft-coded memory circuitry at the first programmable logic region; and a second set of configuration random access memory cells operable to store configuration data for implementing the custom user logic circuitry at the second programmable logic region.

10. The integrated circuit defined in claim 1, wherein the transceiver circuitry comprises hard-coded transmitter circuitry and hard-coded receiver circuitry.

11. The integrated circuit defined in claim 1, wherein the settings of the transceiver circuitry that are controlled by the hard-coded processor circuitry comprise programmable settings that are selected from the group consisting of: programmable signal frequency settings, programmable data rate settings, programmable transceiver enable settings, programmable signal phase settings, and programmable signal offset settings.

12. An integrated circuit comprising:
data circuitry;
hard-coded memory circuitry;
a first processor that performs a first set of initialization operations on the data circuitry by executing instructions stored on the hard-coded memory circuitry;
soft-coded memory circuitry; and
a second processor that performs a second set of initialization operations on the data circuitry by executing instructions stored on the soft-coded memory circuitry.

13. The integrated circuit defined in claim 12, wherein the first processor comprises a hard-coded processor and the second processor comprises a soft-coded processor.

14. The integrated circuit defined in claim 13, wherein the hard-coded processor and the hard-coded memory are fully powered on at a first time after powering on the integrated circuit, wherein the soft-coded processor and the soft-coded memory are fully powered on at a second time that is later than the first time, wherein the hard-coded processor performs the first set of initialization operations after the first time, and wherein the soft-coded processor performs the second set of initialization operations after the second time.

15. The integrated circuit defined in claim 12, further comprising:
hard-coded multiplexer circuitry, wherein the hard-coded multiplexer circuitry selectively routes signals between the first processor and the data circuitry while the first processor performs the first set of initialization instructions and selectively routes signals between the second processor and the data circuitry while the second processor performs the second set of initialization instructions.

16. The integrated circuit defined in claim 12, wherein the data circuitry comprises hard-coded transceiver circuitry and hard-coded clocking circuitry having programmable settings that are set by the first processor while performing the first set of initialization operations and by the second processor while performing the second set of initialization operations.

17. A method of using logic design equipment to generate configuration data for loading onto a target device, wherein the target device has programmable logic circuitry that implements a logic design when loaded with the configuration data, and wherein the target device has hardwired memory circuitry, a hardwired transceiver, and a hardwired processor that initializes the hardwired transceiver based on initialization instructions stored on the hardwired memory circuitry, the method comprising:
with the logic design equipment, identifying a capacity of the hardwired memory circuitry;
with the logic design equipment, identifying a size of the initialization instructions to be stored on the hardwired memory circuitry;
with the logic design equipment, determining whether the identified size of the initialization instructions exceeds the identified capacity of the hardwired memory circuitry;
with the logic design equipment, in response to determining that the size of the initialization instructions exceeds the capacity of the hardwired memory circuitry, adding expanded memory circuitry to the logic design;
with the logic design equipment, generating a netlist file by synthesizing the logic design having the expanded memory circuitry; and
with the logic design equipment, generating the configuration data based on the netlist file.

18. The method defined in claim 17, wherein a first subset of the initialization instructions is stored on the hardwired memory circuitry and a second subset of the initialization instructions is stored on the expanded memory circuitry after the configuration data has been loaded onto the target device.

19. The method defined in claim 18, further comprising:
with the logic design equipment, adding a soft-coded processor to the logic design in response to detection of an event selected from the group consisting of: an autonomous trigger, a user input, and reception of an updated processor logic design; and
with the logic design equipment, generating the netlist file by synthesizing the logic design having the expanded memory circuitry and the soft-coded processor.

* * * * *